Patented Feb. 1, 1944

2,340,328

UNITED STATES PATENT OFFICE 2,340,328

MOTHPROOFING COMPOSITION

Hilton Ira Jones, Wilmette, Ill., assignor to Hizone Products, Wilmette, Ill., a partnership, comprising Hilton Ira Jones, Blanche P. Jones, Haydn Jones, and Llewellyn Jones No Drawing. Application February 14, 1942, Serial No. 430,907

4 Claims. (Cl. 167—37)

My invention relates generally to mothproofing compositions, and it has particular relation to mothproofing compositions containing silicofluorides.

The excellent properties of the silicofluoride radical for mothproofing have long been known in the art. However, heretofore it has not been possible to provide a mothproofing solution wherein the concentration of the silicofluoride radical was sufficiently great so as to be effective as a mothproofing agent without, at the same time, introducing certain objectionable properties. Sodium silicofluoride was early suggested as the mothproofing agent, but it was not satisfactory because this material tended to dust off or beat off, and even more objectionable, this salt had such a low solubility in water that only a partially effective concentration thereof could be obtained. Later on, magnesium silicofluoride was suggested and for a long time was found to be the most satisfactory mothproofing agent available. However, although this salt was sufficiently soluble to give an effective concentration of the silicofluoride radical, it was objectionable in that it gave a harsh "feel" to textiles mothproofed thereby, and in addition it tended to beat off to an undesirable degree, especially from carpets whereon beater-sweepers were used.

In an attempt to overcome the difficulties and objectionable properties of the metallic salt type of silicofluorides as mothproofing agents, certain organic silicofluorides were introduced as mothproofing agents. Although these organic silicofluorides did not have the undesirable properties as mothproofing agents of being harsh to the "feel" or being relatively easily brushed or beaten off, they had certain other equally objectionable properties as mothproofing agents. Specifically, the organic silicofluorides tended to make the treated goods or fabrics sticky so that they collected dust and dirt thereby requiring frequent cleaning. This frequent cleaning tended to remove the mothproofing agent, particularly in the case of rugs wherein the organic silicofluorides were washed off, thereby necessitating the remothproofing of the goods.

Accordingly, the object of my invention, generally stated, is the provision of a silicofluoride type mothproofing composition wherein the silicofluoride radical has an effective concentration and which composition will not give a harsh "feel" to the goods treated, will not easily brush or beat off, and will not be sticky even in moist weather.

I have found that a combination of magnesium silicofluoride and mixed ethanolamine silicofluorides can be adjusted so as to provide a mothproofing solution having an effective concentration of the silicofluoride radical, but not having the harsh "feel" and "easily brushed off" properties of magnesium silicofluoride, nor the sticky properties of the organic silicofluorides. By the expression "mixed ethanolamine silicofluorides" it is intended to designate the mixture of monoethanolamine silicofluoride, diethanolamine silicofluoride, and triethanolamine silicofluoride which is obtained in manufacture before the separation of the mixture into the separate components by fractional distillation. However, any one of the mono, di or tri, ethanolamines alone can be used if desired.

For purposes of economy in shipping and storage, I ordinarily choose to supply my mothproofing composition in concentrated form which can be later conveniently diluted to application strength by the user. Of course, the ratio of the ethanolamine silicofluoride to the magnesium silicofluoride will be the same whether in the concentrated form or in diluted solution.

I have found that a satisfactory mothproofing composition is provided which does not have the "harsh feel" and the brushing off properties of the magnesium silicofluorides, nor the sticky properties of the organic silicofluorides, when the silicofluoride constituents are in the ratio of 1 part by weight of the mixed ethanolamine silicofluorides to from 1 to 3 parts by weight of magnesium silicofluoride. The following is a specific example of one satisfactory mothproofing concentrate embodying my invention and a method of making the same:

EXAMPLE

"A" solution

| | Pounds |
|---|---|
| Magnesium silicofluoride | 60 |
| Ortho-octyl-benzene sulfonate (Na) | 100 |
| Hot water | 200 |

The above mixture is thoroughly agitated and allowed to stand. Double decomposition takes place and the relatively insoluble sodium silicofluoride settles to the bottom, leaving a clear solution of ortho-octyl-magnesium benzene sulfonate.

"B" solution

| | Pounds |
|---|---|
| Magnesium silicofluoride | 71 |
| Water | 355 |
| Solution "A" | 96 |

The ortho-octyl-magnesium-benzene sulfonate solution prepared, for example, as in "A" above is added to the water along with the magnesium silicofluoride. Any precipitate formed may be separated from the desired resulting solution by filtration.

"C" solution

|  | Pounds |
|---|---|
| 35% hydrofluosilicic acid | 100 |
| Mixed ethanolamines | 32 |
| Water | 80 |

The reaction ingredients are mixed with stirring in the water. Stirring is continued until the reaction and the formation of the desired ethanolamine-silicofluorides are complete.

"D" solution

|  | Pounds |
|---|---|
| "B" solution | 82 |
| "C" solution | 28 |

The final solution is prepared by mixing about 25 parts by volume of "C" solution with 75 parts by volume of "B" solution. This gives an ethanolamine- to magnesium-silicofluoride ratio of about 1:1.25. The benzene sulfonate while not being essential has been found to aid in producing a composition of the preferred type.

As stated, any one of the mono, di, or tri, ethanolamine silicofluorides may be used alone with magnesium silicofluoride. In this connection, tests have also shown that a satisfactory mothproofing composition is provided by combining 1 part by weight of monoethanolamine silicofluoride with from 1 to 3 parts by weight of magnesium silicofluoride.

As a broad class, it has been found that the lower alkanolamine silicofluorides provide satisfactory mothproofing compositions according to my invention when combined in proper proportions with magnesium silicofluoride. By lower alkanolamine it is intended to include the methanol, ethanol, propanol, etc., amines.

Extended observation and tests have shown that the magnesium silicofluoride and the ethanolamine silicofluoride are compatible together within the range of concentrations required. The combination is very stable and the concentrated mixtures may be readily diluted as desired. These are all necessary and desirable properties of commercially acceptable mothproofing compositions.

Since many specific mothproofing compositions may be provided which come within the scope of my invention, it is intended that all matter set forth above shall be interpreted as illustrative, and not in a limited sense.

I claim:

1. A mothproofing composition containing magnesium silicofluoride and a lower alkanolamine silicofluoride in a ratio of about 1-3 to 1, respectively.

2. A mothproofing composition containing 1 part by weight of mixed ethanolamine silicofluorides to 1-3 parts by weight of magnesium silicofluoride.

3. A mothproofing composition containing 1 part by weight of mixed ethanolamine silicofluorides to about 1.25 parts by weight of magnesium silicofluoride.

4. A mothproofing composition containing a small amount of a magnesium benzene sulfonate and consisting essentially of ethanolamine silicofluorides and magnesium silicofluoride in a ratio of about 1 to 1-3, respectively.

HILTON IRA JONES.